US007003456B2

(12) United States Patent
Gillick et al.

(10) Patent No.: US 7,003,456 B2
(45) Date of Patent: Feb. 21, 2006

(54) METHODS AND SYSTEMS OF ROUTING UTTERANCES BASED ON CONFIDENCE ESTIMATES

(75) Inventors: Laurence S. Gillick, Newton, MA (US); Robert Roth, Newtonville, MA (US); Linda Manganaro, Arlington, MA (US); Barbara R. Peskin, Berkeley, CA (US); David C. Petty, Cambridge, MA (US); Ashwin Rao, Redmond, WA (US)

(73) Assignee: ScanSoft, Inc.

( * ) Notice: Subject to any disclaimer, the term of this patent is extended or adjusted under 35 U.S.C. 154(b) by 555 days.

(21) Appl. No.: 09/878,173

(22) Filed: Jun. 12, 2001
(Under 37 CFR 1.47)

(65) Prior Publication Data
US 2002/0133341 A1 Sep. 19, 2002

Related U.S. Application Data

(60) Provisional application No. 60/210,823, filed on Jun. 12, 2000.

(51) Int. Cl.
*G10L 15/26* (2006.01)
(52) U.S. Cl. ............ 704/235; 704/246; 704/239; 704/256; 704/252
(58) Field of Classification Search ......... 204/235, 204/246, 239, 251, 256, 270, 252, 240
See application file for complete search history.

(56) References Cited

U.S. PATENT DOCUMENTS

| 5,414,755 A * | 5/1995 | Bahler et al. ............ 704/246 |
| 5,832,430 A * | 11/1998 | Lleida et al. ............ 704/251 |
| 6,067,514 A * | 5/2000 | Chen .................... 704/235 |
| 6,122,613 A * | 9/2000 | Baker ................... 704/252 |
| 6,185,528 B1 * | 2/2001 | Fissore et al. .......... 704/256 |
| 6,216,123 B1 * | 4/2001 | Robertson et al. ....... 704/251 |
| 6,298,326 B1 * | 10/2001 | Feller .................. 704/270 |
| 6,308,158 B1 * | 10/2001 | Kuhnen et al. .......... 704/235 |
| 6,535,850 B1 * | 3/2003 | Bayya .................. 704/239 |

FOREIGN PATENT DOCUMENTS

| GB | 2323694 A | 9/1998 |
| WO | WO9834217 | 8/1998 |

OTHER PUBLICATIONS

European Patent Office, International Search Report for PCT/US01/18719, mailed Apr. 12, 2001.
Gillick L. et al., A Probalistic Approach to Confidence Estimation and Evaluation, 1997 IEEE International Conference on Acoustics, Speech and Signal Processing, Speech Processing, Munich, Apr. 21, 1997, vol. 2, pp. 879-882.

* cited by examiner

*Primary Examiner*—Vijay B. Chawan
(74) *Attorney, Agent, or Firm*—Fish & Richardson P.C.

(57) ABSTRACT

A computer-based method of routing a message to a system includes receiving a message, and processing the message using large-vocabulary continuous speech recognition to generate a string of text corresponding to the message. The method includes generating a confidence estimate of the string of text corresponding to the message and comparing the confidence estimate to a predetermined threshold. If the confidence estimate satisfies the predetermined threshold, the string of text is forwarded to the system. If the confidence estimate does not satisfy the predetermined threshold, the information relating to the message is forwarded to a transcriptionist. The message may include one or more utterances. Each utterance in the message may be separately or jointly processed. In this way, a confidence estimate may be generated and evaluated for each utterance or for the whole message. Information relating to each utterance may be separately or jointly forwarded based on the results of the generation and evaluation.

35 Claims, 2 Drawing Sheets

METHODS AND SYSTEMS OF ROUTING UTTERANCES BASED ON CONFIDENCE ESTIMATES

CROSS REFERENCE TO RELATED APPLICATIONS

This application claims benefit of U.S. Provisional Application No. 60/210,823, filed Jun. 12, 2000, which is incorporated by reference.

TECHNICAL FIELD

This invention relates to confidence estimates in speech recognition.

BACKGROUND

The computation of word-level confidence estimates for the results produced by a speech recognition system has become a well-established practice. In general, each of these estimates indicates the probability that a particular word in the results is correct (that is, that the speaker actually said the word). Word-level confidence estimates have been applied to such tasks as spotting misrecognized or out-of-vocabulary words, rejecting recognition hypotheses in command-and-control environments, and controlling prompts for confirmation in computer-based dialogue systems. Techniques for determining word-level confidence estimates are described by L. Gillick, Y. Ito, and J. Young in "A Probabilistic Approach to Confidence Estimation and Evaluation," Proc. ICASSP-97, pages 879–882 (1997), which is incorporated by reference.

SUMMARY

In one general aspect, routing an utterance to a system includes receiving an utterance, and processing the utterance using large-vocabulary continuous speech recognition to generate a string of text corresponding to the utterance. A confidence estimate of the string of text corresponding to the utterance is generated and compared to a predetermined threshold. If the confidence estimate satisfies the predetermined threshold, the string of text is forwarded to the system. If the confidence estimate does not satisfy the predetermined threshold, the information relating to the utterance is forwarded to a transcriptionist.

Implementations may include one or more of the following features. For example, the utterance may include two or more words. The transcriptionist may determine an acceptable string of text and forwarding the acceptable string of text to the system if the confidence estimate does not satisfy the predetermined threshold.

The confidence estimate may indicate a probability that the string of text is an acceptable representation of the utterance. The information relating to the utterance may include one or more of: the utterance, the string of text corresponding to the utterance, and the generated confidence estimate of the string of text.

The confidence estimate may be generated by selecting one or more predictors relating to the large-vocabulary continuous speech recognition, and by training a confidence model using the one or more predictors. The confidence estimate may be generated by extracting values of the one or more predictors based on the received utterance, and by providing the extracted values to the confidence model to generate the confidence estimate.

The confidence estimate may be further compared to a second predetermined threshold. If the confidence estimate does not satisfy the first predetermined threshold and does satisfy the second predetermined threshold level, the information relating to the utterance may be forwarded to the user who spoke the utterance, and the user may be permitted to act in response to the forwarded information.

The transcriptionist may be a human transcriptionist, and the system may include a human recipient.

In another general aspect, routing a message to a system includes receiving a message including utterances, and processing each utterance in the message using large-vocabulary continuous speech recognition to generate a string of text corresponding to that utterance. A confidence estimate is generated for each string of text that corresponds to an utterance and each confidence estimate is compared to a predetermined threshold. If all of the confidence estimates satisfy the predetermined threshold, the string of text is forwarded to the system. If any one of the confidence estimates does not satisfy the predetermined threshold level, the message is forwarded to a transcriptionist.

Implementations may include one or more of the following features. For example, the confidence estimate for a string of text may indicate a probability that the string of text is an acceptable representation of the corresponding utterance.

The transcriptionist may determine acceptable strings of text for the message and forward the acceptable strings of text for the message to the system if any one of the confidence estimates does not satisfy the predetermined threshold.

Generation of the confidence estimate for a string of text may include selecting one or more predictors for the string of text based on the large-vocabulary continuous speech recognition and training a confidence model for the string of text using the one or more predictors. Generation of the confidence estimate for a string of text may include extracting values of the one or more predictors for the string of text based on the corresponding utterance and providing the extracted values for the utterance to the confidence model to generate the confidence estimate for the string of text.

Each confidence estimate may be compared to a second predetermined threshold. In this case, if a confidence estimate does not satisfy the first predetermined threshold level and satisfies the second predetermined threshold level, information relating to the message is forwarded to the user who spoke the message, and the user is permitted to act in response to the forwarded information. The information relating to the message may include one or more of the message, the string of text for the confidence estimate, and the confidence estimate for the string of text.

The transcriptionist may be a human transcriptionist, and the system may include a human recipient.

In another general aspect, routing a message to a system includes receiving a message including utterances and processing each utterance in the message using large-vocabulary continuous speech recognition to generate a string of text corresponding to that utterance. A confidence estimate is generated for each string of text that corresponds to an utterance and each confidence estimate is compared to a predetermined threshold. If all of the confidence estimates satisfy the predetermined threshold, the strings of text are forwarded to the system. If one of the confidence estimates does not satisfy the predetermined threshold, information relating to the utterance corresponding to that confidence estimate is forwarded to a transcriptionist.

Implementations may include one or more of the following features. For example, a confidence estimate for a string of text may indicate a probability that the string of text is an acceptable representation of the corresponding utterance.

After the transcriptionist determines an acceptable string of text for the utterance, the acceptable string of text for the message may be forwarded to the system if one of the confidence estimates does not satisfy the predetermined threshold.

Generating the confidence estimate for a string of text may include selecting one or more predictors for the string of text based on the large-vocabulary continuous speech recognition and training a confidence model for the string of text using the one or more predictors. Generating the confidence estimate for a string of text may include extracting values of the one or more predictors for the string of text based on the corresponding utterance and providing the extracted values for the utterance to the confidence model to generate the confidence estimate for the string of text.

The information relating to the utterance corresponding to the confidence estimate may include one or more of the message, the string of text for the confidence estimate, and the confidence estimate.

Each confidence estimate may be composed to a second predetermined threshold. In this case, if any one of the confidence estimates does not satisfy the first predetermined threshold level and satisfies the second predetermined threshold level, then the information relating to the utterance that generated that confidence estimate is forwarded to the user who spoke the message so that the user is permitted to act in response to the forwarded information.

The transcriptionist may be a human transcriptionist, and the system may include a human recipient.

In another general aspect, routing a message to a system includes receiving a message including utterances and processing each utterance in the message using large-vocabulary continuous speech recognition to generate a string of text for each utterance in the message. A confidence estimate is generated for each string of text that corresponds to an utterance, a message confidence estimate is calculated based on the confidence estimates for the strings of text generated for the message, and the message confidence estimate is compared to a predetermined threshold. If the message confidence estimate satisfies the predetermined threshold, the strings of text generated for the message are forwarded to the system. If the message confidence estimate does not satisfy the predetermined threshold, information relating to the message is forwarded to a transcriptionist.

Implementations may include one or more of the following features. For example, the confidence estimate for a string of text may indicate a probability that the string of text is an acceptable representation of the corresponding utterance.

The transcriptionist may determine one or more acceptable strings of text and for the utterances of the message, and the acceptable strings of text for the message may be forwarded to the system if the message confidence estimate does not satisfy the predetermined threshold.

The information relating to the message may include one or more of the message, the string of text for each utterance in the message, and the message confidence estimate.

The confidence estimate for a string of text may be generated by selecting one or more predictors for the string of text based on the large-vocabulary continuous speech recognition and by training a confidence model for the string of text using the one or more predictors. The confidence estimate for a string of text may be generated by extracting values of the one or more predictors for the string of text based on the corresponding utterance and by providing the extracted values for the utterance to the confidence model to generate the confidence estimate for the string of text.

The message confidence estimate may be compared to a second predetermined threshold. In this case, if the message confidence estimate does not satisfy the first predetermined threshold and it satisfies the second predetermined threshold, the information relating to the message is forwarded to the user who spoke the message, thus permitting the user to act in response to the forwarded information.

The transcriptionist may be a human transcriptionist, and the system may include a human recipient.

The routing uses automatic speech recognition and utterance-level confidence estimates to expedite processing that is currently performed by labor-intensive, human transcription.

Other features and advantages will be apparent from the description, the drawings, and the claims.

DESCRIPTION OF DRAWINGS

Like reference symbols in the various drawings indicate like elements.

DETAILED DESCRIPTION

A large-vocabulary continuous speech recognition system processes an utterance to generate a string of text corresponding to the utterance. The string of text then may be analyzed by a confidence-based system, which generates or calculates an utterance-level confidence estimate (perhaps by using the speech recognition system) that assesses the acceptability or intelligibility of the string of text. The confidence-based system may be separate from the speech recognition system that processes the utterance, may include the speech recognition system, or may perform in concert with operation of the speech recognition system.

Figure 1:
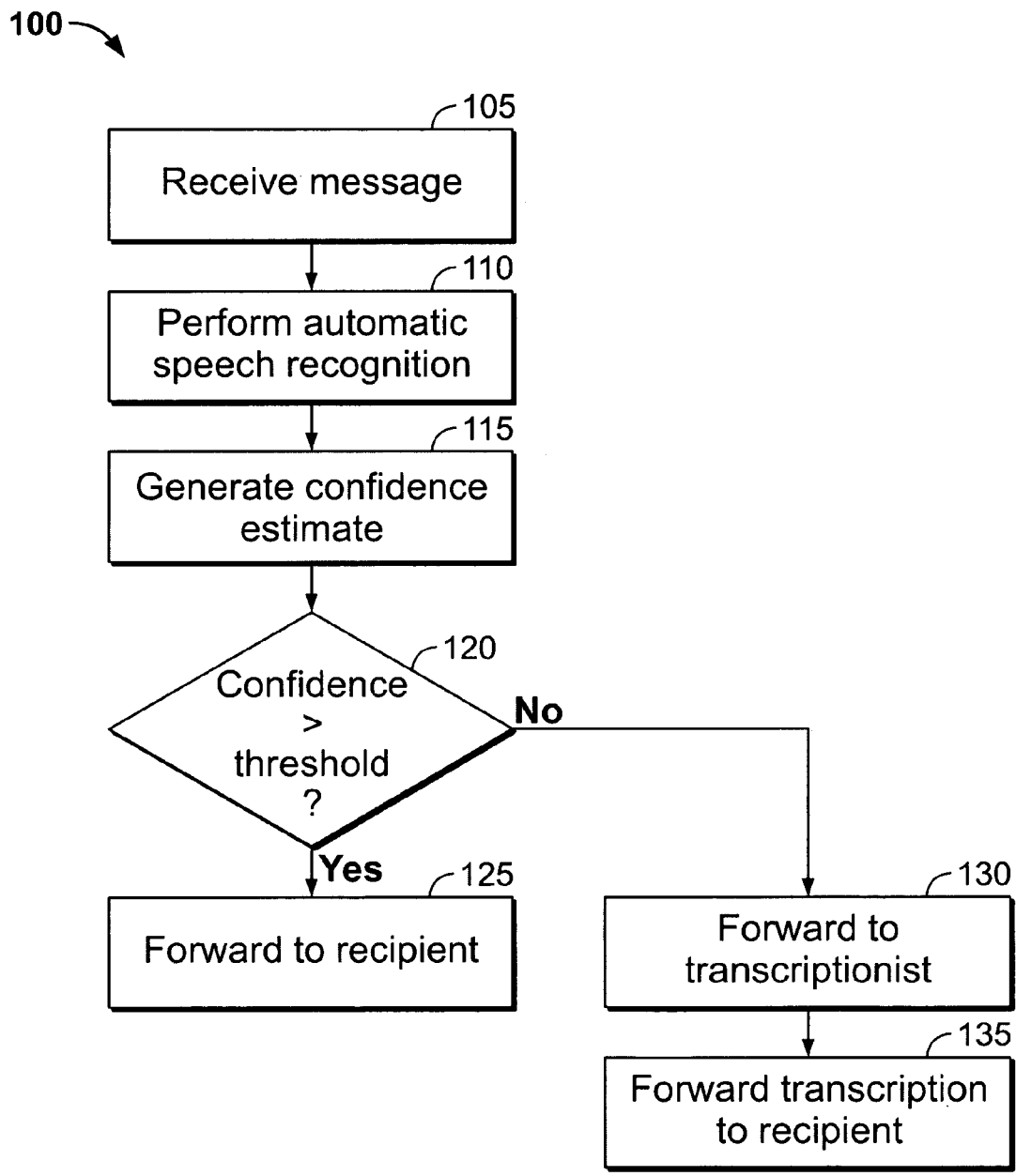
FIG. 1 is a flow chart of a procedure for filtering messages using utterance-level confidence estimates.

The confidence-based system may be a confidence-based routing system. The confidence-based routing system routes an utterance by computing the utterance-level confidence estimate for the entire utterance and then analyzing the utterance-level confidence estimate. For example, referring to FIG. 1, the confidence-based routing system may use utterance-level confidence estimates in a procedure 100 for providing automatic routing of messages (for example, pager messages) for an application such as a messaging service. Typically, such messages are short enough that they each include only a single utterance (that is, a single sequence of words with silence at either end of the sequence). Accordingly, except where noted, the following discussion uses message and utterance interchangeably.

As shown, a message in the form of an utterance is received by the messaging application (step 105). Upon receipt, the utterance is provided to a speech recognition system that performs automatic speech recognition on the utterance (step 110) to generate a string of text corresponding to the utterance (a process often referred to as an initial transcription).

During and after the recognition process, the confidence-based system and/or the speech recognition system generate an utterance-level confidence estimate (step 115). This estimate indicates the probability that the string of text is an acceptable representation of the utterance.

The confidence-based system compares the confidence estimate to a predetermined threshold level (step 120). If the confidence estimate exceeds the threshold (that is, the string of text is deemed acceptable), then the string of text is forwarded automatically to the intended recipient of the message (step 125). If the confidence estimate does not exceed the threshold (that is, the string of text is deemed unacceptable), then the information relating to the utterance (possibly together with information relating to the string of text) is forwarded to a transcriptionist (step 130). Information relating to the utterance may include the utterance, the unacceptable string of text, and/or the confidence estimate for the utterance. Information relating to the utterance may include information about one or more portions of the utterance that are particularly unacceptable. The transcriptionist may be a human transcriptionist or a more powerful speech recognition system. The transcriptionist performs processing of the information to determine an acceptable string of text before sending the acceptable string of text to the intended recipient (step 135).

When a message includes multiple utterances, each utterance may be separately evaluated and sent to a transcriptionist as needed. As another alternative, a message may be sent to a transcriptionist whenever any utterance of the message has an insufficient confidence estimate. As another alternative, confidence estimates for the utterances of a message may be combined, with the transcription decision being based on the combined estimate.

The confidence-based routing system is particularly effective if the application domain is reasonably constrained so that a fairly tight language model can be trained. In this case, the confidence estimate detects when a message fits the expectations of the language model, and the system can bypass a transcriptionist for those messages in which the system is highly confident. In this way, very few unacceptable recognitions bypass the transcriptionist. Because of the constraints of the language model, failures of messages to conform to the expectations of the language model are easier to detect due either to bad language model scores (if the word sequence is surprising) or to bad acoustic scores (if the language model constraints force the recognizer to hypothesize words other than what the speaker actually said). Each of these cases generally results in a low confidence estimate. The actual trade-off between passing through acceptable messages without human intervention from the transcriptionist and failing to re-route unacceptable ones may be varied by varying the threshold used to evaluate the confidence scores.

In contrast to fully-constrained grammar-based systems (such as those used in many telephone-based information services), where the system can only process utterances of a pre-defined form, a confidence-based system using large-vocabulary continuous speech recognition for the initial transcription can accept arbitrary input. The confidence-based system then uses the utterance-level confidence estimates to decide whether the utterance has been acceptably transcribed.

Figure 2:
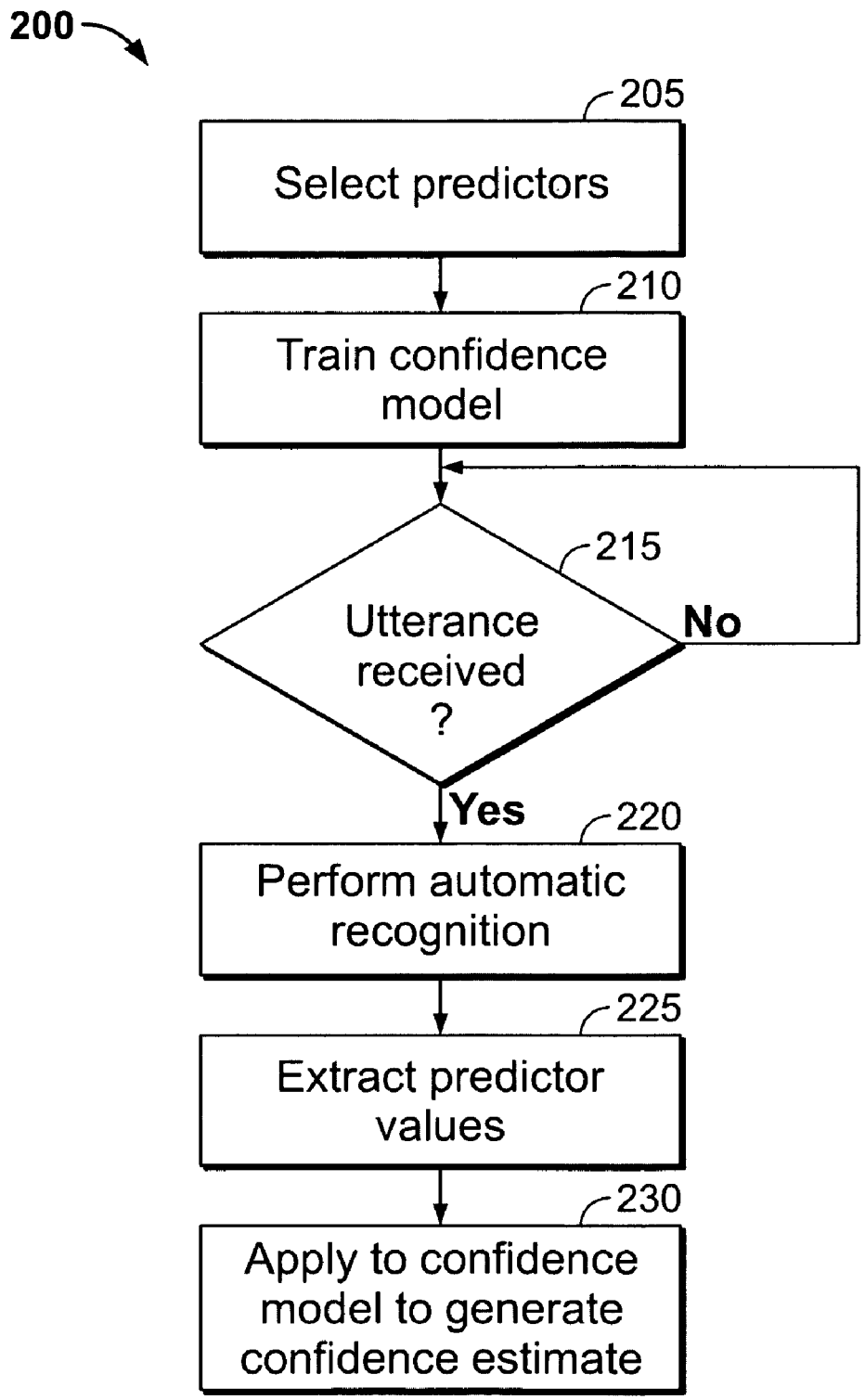
FIG. 2 is a flow chart of a procedure for generating utterance-level confidence estimates.

Referring to FIG. 2, the confidence-based system generates the utterance-level confidence estimates (for example, step 115 in FIG. 1) according to a procedure 200. Initially, the confidence-based system selects predictors from the speech recognition system (step 205). The predictors may closely track recognition performance and may include information concerning the likelihood that a string of text for an utterance is acceptable.

Utterance-level predictors may be generated from word-level predictors, such as the frequency of appearance of the word in hypotheses on the N-best list (where the N-best list includes the speech recognition system's N best hypotheses as to the text of the utterance, N might equal, for example, 100, and the confidence increases with increasing frequency), the language model score for the word (where confidence increases with a better score), the average difference between the acoustic score on each frame and the best acoustic score achieved by any active recognition state for the frame (where confidence increases as the average difference decreases), and the number of alternative word hypotheses entertained by the speech recognition system and ending at the same time as the given word (where confidence increases as the number of competing hypotheses decreases). The utterance-level predictors may be generated, for example, by averaging the word-level predictors, or by selecting the maximum or minimum values. So, for example, utterance-level predictors may include the average value of "acoustic score—best score" over all speech frames in the utterance, the average language model score over all words, the average frequency with which recognized words appear on the N-best list, and the highest and/or lowest frequency with which any recognized word appears on the N-best list.

Other utterance-level predictors include the average over all speech frames in the utterance of the number of HMM states that are active at that time in the entire HMM network, the log of the number of recognized words in the utterance, and the number of speech frames in the utterance divided by the total number of recognized words. Another utterance-level predictor is the maximum number of words ending at the same time as any of the words in the recognized utterance (that is, as noted above, at each word-end time, the total number of words ending then over all currently active hypotheses in the speech recognition system's search space are counted, with the maximum count over the words in the utterance used as the predictor).

Some of the predictors are determined using straightforward measurements based on standard speech recognition scores. Some predictors represent properties like the length of the utterance or the average length of words in the utterance. Other predictors may represent or include information relating to the uncertainty of the speech recognition at a particular time (that is, how much competition there is for the best hypothesis).

Next, the confidence-based system trains a confidence model using the set of predictors (step 210). This step uses a confidence training set that includes speech data, known recognition results for the speech data, and indicators as to whether the recognition results for each utterance were acceptable. A vector of predictor values is compiled for each utterance in the confidence training set, and the matrix resulting from combining the vectors is used to train a probability model for computing confidence values. In one implementation, the model may be trained to maximize the average log likelihood (L) over the recognized training messages:

$$L = \frac{1}{n} \times \left[ \sum_{i=1}^{n} [c_i \log(p_i) + (1 - c_i)\log(1 - p_i)] \right],$$

where n is the total number of utterances, $p_i$ is the predicted probability that message i is acceptable, and $c_i$ is 1 if the utterance is acceptable and 0 if the utterance is not acceptable.

The confidence model may be trained using a logistic regression model. In particular, the probability, p, that the recognition is acceptable is modeled as:

$$\log\left(\frac{p}{1-p}\right) = B^T X,$$

where B is the vector of model parameters to be trained, T denotes the transpose of the vector B, and X is the vector of predictor scores. In other implementations, generalized additive models or neural networks may be substituted for the logistic regression model in order to capture nonlinearities in the predictor terms.

Selection of the predictors (step 205) and training of the confidence model (210) only need to be done once in training the confidence-based system. Typically, this training is done before the system is deployed although the system may be retuned or adapted after deployment. Thereafter, when an utterance is received (step 215) and recognized (step 220), the speech recognition system (or the confidence-based system) extracts values of the predictors (step 225) and provides those values to the confidence model to generate the confidence estimate (step 230).

The threshold against which the confidence estimate is compared may be tuned using additional training data. In particular, the threshold may be set to a value that optimizes the trade-off between passing a desired portion of acceptably recognized utterances while not passing too many unacceptably recognized utterances.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

A number of implementations have been described. Nevertheless, it will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

For example, some implementations may employ a series of thresholds such that, for example, utterances with the highest confidence are passed directly to the message recipient, utterances with somewhat lower confidence values trigger a confirmation/verification dialogue with the sender, and messages falling into the lowest confidence range are sent directly for human transcription. Some implementations may employ a threshold that is determined during routing and/or training. For example, the threshold may be determined based on noise in the system or the routing application.

What is claimed is:

1. A computer-based method of routing an utterance to a system, the method comprising:
   receiving an utterance including two or more words;
   processing the utterance using large-vocabulary continuous speech recognition to generate a string of text corresponding to the utterance;
   generating a confidence estimate of the string of text corresponding to the utterance, the generating including:
      selecting one or more predictors relating to the large-vocabulary continuous speech recognition, and
      training a confidence model using the one or more predictors;
   comparing the confidence estimate to a predetermined threshold;
   if the confidence estimate satisfies the predetermined threshold, forwarding the string of text to the system; and
   if the confidence estimate does not satisfy the predetermined threshold, forwarding information relating to the utterance to a transcriptionist.

2. The method of claim 1 further comprising if the confidence estimate does not satisfy the predetermined threshold, having the transcriptionist determine an acceptable string of text and forwarding the acceptable string of text to the system.

3. The method of claim 1 in which the confidence estimate indicates a probability that the string of text is an acceptable representation of the utterance.

4. The method of claim 1 in which the information relating to the utterance comprises one or more of: the utterance, the string of text corresponding to the utterance, and the generated confidence estimate of the string of text.

5. The method of claim 1 in which generating the confidence estimate comprises:
   extracting values of the one or more predictors based on the received utterance; and
   providing the extracted values to the confidence model to generate the confidence estimate.

6. The method of claim 1 further comprising:
   comparing the confidence estimate to a second predetermined threshold; and
   if the confidence estimate does not satisfy the first predetermined threshold and does satisfy the second predetermined threshold level:

forwarding the information relating to the utterance to the user who spoke the utterance, and permitting the user to act in response to the forwarded information.

7. The method of claim 1 in which the transcriptionist is a human transcriptionist.

8. The method of claim 1 in which the system includes a human recipient.

9. A computer-based method of routing a message to a system, the method comprising:

receiving a message including utterances;

processing each utterance in the message using large-vocabulary continuous speech recognition to generate a string of text corresponding to that utterance;

generating a confidence estimate for each string of text that corresponds to an utterance, the generating including:

selecting one or more predictors for the string of text based on the large-vocabulary continuous speech recognition; and training a confidence model for the string of text using the one or more predictors;

comparing each confidence estimate to a predetermined threshold;

if all of the confidence estimates satisfy the predetermined threshold, forwarding the string of text to the system; and if any of the confidence estimates does not satisfy the predetermined threshold level, forwarding the message to the transcriptionist.

10. The method of claim 9 in which a confidence estimate for a string of text indicates a probability that the string of text is an acceptable representation of the corresponding utterance.

11. The method of claim 9 further comprising, if any one of the confidence estimates does not satisfy the predetermined threshold, having the transcriptionist determine acceptable strings of text for the message and forwarding the acceptable strings of text for the message to the system.

12. The method of claim 9 in which generating the confidence estimate for a string of text comprises:

extracting values of the one or more predictors for the string of text based on the corresponding utterance; and providing the extracted values for the utterance to the confidence model to generate the confidence estimate for the string of text.

13. The method of claim 9 further comprising:

comparing each confidence estimate to a second predetermined threshold; and if a confidence estimate does not satisfy the first predetermined threshold level and satisfies the second predetermined threshold level:

forwarding information relating to the message to the user who spoke the message, and permitting the user to act in response to the forwarded information.

14. The method of claim 13 in which the information relating to the message comprises one or more of: the message, the string of text for the confidence estimate, and the confidence estimate for the string of text.

15. The method of claim 9 in which the transcriptionist is a human transcriptionist.

16. The method of claim 9 in which the system includes a human recipient.

17. The method of claim 9 in which at least one utterance in the message comprises two or more words.

18. A computer-based method of routing a message to a system, the method comprising:

receiving a message including utterances;

processing each utterance in the message using large-vocabulary continuous speech recognition to generate a string of text corresponding to that utterance;

generating a confidence estimate for each string of text that corresponds to an utterance, the generating including:

selecting one or more predictors for the string of text based on the large-vocabulary continuous speech recognition; and training a confidence model for the string of text using the one or more predictors;

comparing each confidence estimate to a predetermined threshold;

if all of the confidence estimates satisfy the predetermined threshold, forwarding the strings of text to the system; and if one of the confidence estimates does not satisfy the predetermined threshold, forwarding information relating to the utterance corresponding to that confidence estimate to a transcriptionist.

19. The method of claim 18 in which a confidence estimate for a string of text indicates a probability that the string of text is an acceptable representation of the corresponding utterance.

20. The method of claim 18 further comprising, if one of the confidence estimates does not satisfy the predetermined threshold, after the transcriptionist determines an acceptable string of text for the utterance, forwarding the acceptable string of text for the message to the system.

21. The method of claim 18 in which generating the confidence estimate for a string of text comprises:

extracting values of the one or more predictors for the string of text based on the corresponding utterance; and providing the extracted values for the utterance to the confidence model to generate the confidence estimate for the string of text.

22. The method of claim 18 in which the information relating to the utterance corresponding to the confidence estimate comprises one or more of: the message, the string of text for the confidence estimate, and the confidence estimate.

23. The method of claim 18 further comprising:

comparing each confidence estimate to a second predetermined threshold; and if any one of the confidence estimates does not satisfy the first predetermined threshold level and satisfies the second predetermined threshold level:

forwarding the information relating to the utterance that generated that confidence estimate to the user who spoke the message, and permitting the user to act in response to the forwarded information.

24. The method of claim 18 in which the transcriptionist is a human transcriptionist.

25. The method of claim 18 in which the system includes a human recipient.

26. The method of claim 18 in which at least one utterance in the message comprises two or more words.

27. A computer-based method of routing a message to a system, the method comprising:

receiving a message including utterances;

processing each utterance in the message using large-vocabulary continuous speech recognition to generate a string of text for each utterance in the message;

generating a confidence estimate for each string of text that corresponds to an utterance, the generating including:
  selecting one or more predictors for the string of text based on the large-vocabulary continuous speech recognition; and
  training a confidence model for the string of text using the one or more predictors;
calculating a message confidence estimate based on the confidence estimates for the strings of text generated for the message;
comparing the message confidence estimate to a predetermined threshold;
if the message confidence estimate satisfies the predetermined threshold, forwarding the strings of text generated for the message to the system; and
if the message confidence estimate does not satisfy the predetermined threshold, forwarding information relating to the message to a transcriptionist.

28. The method of claim 27 in which a confidence estimate for a string of text indicates a probability that the string of text is an acceptable representation of the corresponding utterance.

29. The method of claim 27 further comprising, if the message confidence estimate does not satisfy the predetermined threshold, having the transcriptionist determine one or more acceptable strings of text and for the utterances of the message, forwarding the acceptable strings of text for the message to the system.

30. The method of claim 27 in which information relating to the message comprises one or more of: the message, the string of text for each utterance in the message, and the message confidence estimate.

31. The method of claim 27 in which generating the confidence estimate for a string of text comprises:
  extracting values of the one or more predictors for the string of text based on the corresponding utterance; and
  providing the extracted values for the utterance to the confidence model to generate the confidence estimate for the string of text.

32. The method of claim 27 further comprising:
  comparing the message confidence estimate to a second predetermined threshold; and
  if the message confidence estimate does not satisfy the first predetermined threshold and it satisfies the second predetermined threshold;
    forwarding the information relating to the message to the user who spoke the message, and
    permitting the user to act in response to the forwarded information.

33. The method of claim 27 in which the transcriptionist is a human transcriptionist.

34. The method of claim 27 in which the system includes a human recipient.

35. The method of claim 27 in which at least one utterance in the message comprises two or more words.

* * * * *